UNITED STATES PATENT OFFICE 2,576,931

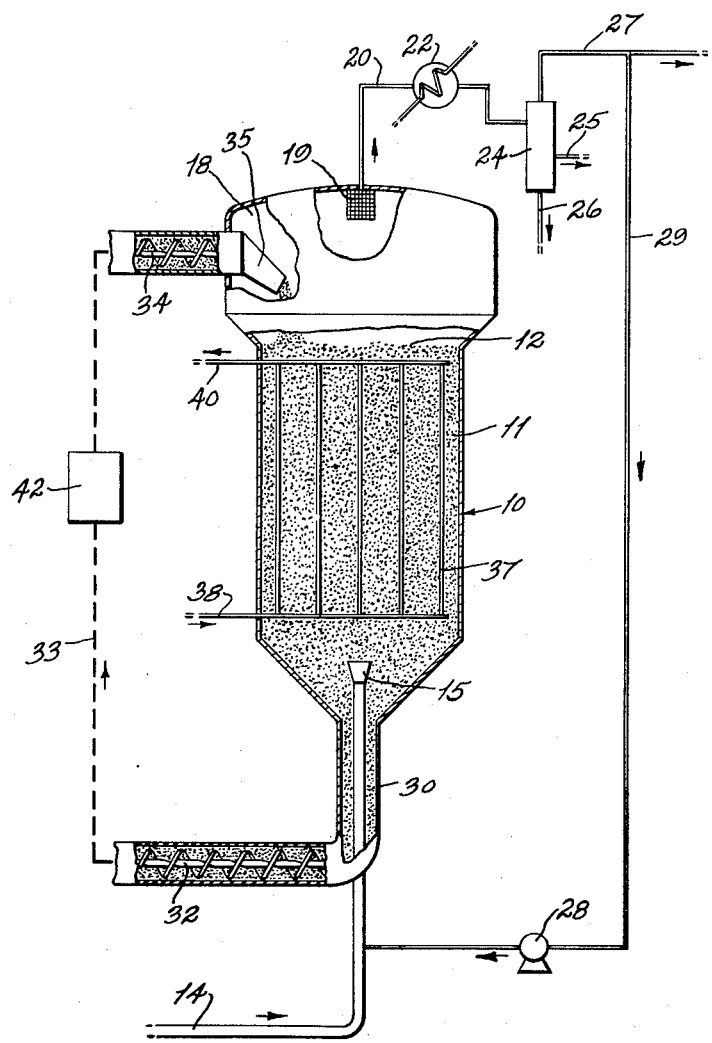

SYNTHESIS OF HYDROCARBONS IN THE PRESENCE OF A FLUID PHASE CATALYST

Paul W. Garbo, Freeport, N. Y., assignor to Hydrocarbon Research, Inc., New York, N. Y., a corporation of New Jersey Application June 25, 1949, Serial No. 101,403

5 Claims. (Cl. 260—449.6)

The present invention relates to the synthesis of hydrocarbons, oxygenated hydrocarbons and mixtures thereof by the catalytic reduction of carbon oxide with hydrogen, and more specifically, is concerned with improving the yield of desired product fractions by passing the reactants upwardly through a fluid phase of solid particle synthesis catalyst, the upper or outlet portion of which is continually supplied with catalyst particles of high activity.

In particular, therefore, the invention contemplates maintaining a high catalytic activity of the fluidized contact mass at a point substantially above the bottom or catalyst outlet section, and preferably adjacent the upper level of the fluidized mass where the reaction gases emerge from contact with the catalyst, in order to effect a more complete consumption of relatively dilute reactants existing at this point and thus form additional desired products of reaction.

To this end, a stream of synthesis gas comprising essentially hydrogen and carbon monoxide is continually passed upwardly through a mass of synthesis catalyst particles under reaction conditions at a linear velocity effective to maintain the particles in a uniform dense fluid phase, the effluent gasiform products are withdrawn from the upper, pseudo-liquid level of the fluid phase and are, thereafter, subjected to treatment for separation and recovery of the desired products of reaction. Simultaneously, catalyst, in a state of high catalytic activity, is drawn off from the lower portion of the reaction zone in the vicinity of the point of introduction of the reactant feed stream and continuously reintroduced into the reaction zone at a level substantially above the bottom or reactant inlet zone, and preferably at about the upper surface of the dense fluid phase. It is contemplated effecting such bottom withdrawal and top reintroduction of the particles at a relatively high rate, such that the upper section of the contact mass is continuously occupied by a substantial proportion of high activity particles.

The invention moreover particularly contemplates transportation of the catalyst from the bottom to the upper portion of the reaction zone, without substantial alteration or degradation, that is, without impairing its characteristic condition of high activity. For example, one objection is to avoid any substantial oxidizing influence as by contact with steam or other oxidizing agent at an elevated temperature. For similar reason, reduction or other chemical change is likewise avoided, preferably by maintaining the cycling particles under conditions of substantial inertness.

As above intimated, the catalyst recycle to the upper portion of the reaction zone is effected at a substantial rate sufficient to insure the presence of an effective proportion of the highly active particles in the upper or gas outlet portion of the fluid phase. More specifically, the invention generally involves the downward movement of the catalyst mass through the reaction zone with a linear velocity of at least about twice the linear velocity of the gaseous stream flowing upwardly through the reaction zone; preferably the downward velocity of the catalyst is at least about five times the upward velocity of the gaseous stream. In the majority of the cases, the fluidized catalyst mass will have a depth of about 5 to 15 feet and the gases flowing up therethrough will have a linear velocity of about 0.3 to 1.5 feet per second. As an illustrative example, the gases pass up through a fluidized catalyst mass having a depth of 8 feet with a velocity of 0.4 foot per second, while the catalyst mass is discharged from the bottom of the reaction zone and recharged to the top thereof at a rate to maintain a downward velocity of the catalyst through the reaction zone of 2.5 feet per second.

Therefore, in operation, the contact mass embodies a dense fluid phase of solid catalytic particles, of substantial vertical elevation, maintained in a substantially uniform condition of turbulence by the upflow of gasiform reactants, having an upper interface or level from which the effluent gases emerge, but in which there is a continuous overall and downward progression or migration of catalyst particles maintained by continuous removal of the active particles at the bottom and their continuous reintroduction at about the upper level of the fluid phase. As a result, the upper portion of the reaction zone is continuously occupied as above indicated by highly active particles which effectively convert the last traces of reactants during the latter stages of the reaction, without undesirable loss to side reactions which occur upon prolonged contact of extremely dilute reactants with catalyst of poor activity.

The rate of catalyst recycle may be advantageously increased beyond the preferred minimum rates above indicated, limited only by the practical considerations of catalyst handling and the ability to maintain a uniform, dense fluid phase of particles within the reaction zone.

The present invention is primarily based on the discovery that particles of synthesis catalyst in the region of the entering fresh reactant stream assume a condition of high catalytic activity, whereas particles nearer the upper extremity of the reaction zone are relatively deficient in activity. Presumably, the lower activity in the upper portions of the catalyst mass results from the fact that the dilute reactant stream in the last stages of conversion is accompanied, among other things, by substantial proportions of by-product $H_2O$ and/or $CO_2$ which are highly oxidizing in character, and therefore, tend to diminish by oxidation, the active surface carbide centers of the catalyst essential to maximum catalyst activity. In addition, a tendency for segregated stratification of the more oxidized catalyst particles appears to be promoted, even in the fluidized phase, by a somewhat decreased settling rate of the relatively oxidized particles.

On the other hand, more highly carbided and more active particles tend to exist in the atmosphere of the concentrated reactants adjacent the feed inlet. At this point, the typical proportioning of $H_2$ and $CO$ and the inherent stripping effect of the fresh feed stream essentially free of normally liquid hydrocarbons apparently maintain the particles at maximum activity.

For example, the following table shows the activity of an iron hydrocarbon synthesis catalyst of varying degrees of carbide content, the remainder of the catalyst consisting essentially of iron oxide. In each case, evaluation was conducted with a fresh feed gas consisting of $H_2$ and $CO$ in 2:1 molar ratio, at a temperature of 650° F., pressure of 200 p. s. i., a flow rate of 40 standard cubic feet of fresh feed gas per pound of catalyst per hour, and a 2:1 rate of recycle of normally gaseous products of reaction to the reaction zone.

| Test | A | B | C |
|---|---|---|---|
| Iron carbide content of catalyst, Wgt. per cent | 87 | 45 | 28 |
| Yields (grams per normal cu. meter of fresh feed gas): | | | |
| Separated oil | 91 | 83 | 25 |
| Total $C_3$+Hydrocarbons [1] | 133 | 125 | 45 |
| $CO_2$ | 59 | 49 | 82 |

[1] Including oil-soluble oxygenated hydrocarbons.

It is evident from these data that the more active particles are those relatively high in carbide content, and that as oxidation of the particles progresses, catalytic activity decreases.

As a result of maintaining a high proportion of the more active catalyst particles near the outlet for the reaction gases, the present invention promotes rapid completion of the reaction at the point where the concentration of the reactants approaches a minimum, and therefore, enables the substantially complete consumption of the reactants with less catalyst and at a higher space velocity.

Another advantage of the present invention resides in restricting excessive reaction activity at the bottom of the reaction zone. One of the difficulties hitherto encountered has been the reaction of an excessively large proportion of the feed materials close to their inlet to the reaction zone where the highly concentrated reactants meet the highly active catalyst particles. Actually, about 90% or more of the available reactants may be consumed almost immediately upon contacting the catalyst, so that the remaining and major portion of the vertical extent of the reaction zone functions to react only a minor proportion of the reactants. As a result, the major portion of the exothermic heat of reaction is liberated locally near the feed inlet, imposing an excessive burden of temperature control at this point. Experience has indicated that in spite of apparent temperature control in this region, the temperature does rise uncontrolledly at minute localized areas of the catalyst surface, thus accounting for product losses in excessive gas formation, deposition of undesirable carbon, and shortened catalyst life.

The present invention, by effecting continual migration of less active catalyst particles toward the reactant feed inlet, materially decreases the disadvantage of excessive heat generation at the feed inlet by better distribution of the exothermic reaction throughout the vertical exent of the reactor.

Among other advantages, the invention results in desirable countercurrent contact between the catalyst and reactants, which additionally counteracts the tendency for a vertical temperature gradient through the reaction zone, and also promotes improved heat transfer between the fluid phase of catalyst and temperature controlling surfaces immersed therein, the elimination of so-called dead spots where fluidization is incomplete and non-uniform, and the general maintenance of precise and uniform temperature control.

In order to more specifically illustrate the invention, reference is had to the embodiment represented more or less diagrammatically in the accompanying drawing wherein numeral 10 indicates an upstanding, cylindrical reactor occupied by a mass of particulate catalyst 11 supported in a dense fluid phase by the upflowing reactant gases, such that it rises to the upper level or interface indicated by the numeral 12.

The reactant feed stream comprises a mixture of hydrogen and carbon monoxide drawn from any suitable source, not shown, through pipe 14 and discharged into the bottom portion of the reactor through a preferably flaring distributor nozzle 15. The distributor 15, however, may take any other suitable form such as a perforated distributing ring or other type of manifold, or inlet adapted to effect substantially uniform introduction of the feed gases to the bottom portion of the reaction zone.

Accordingly, the reactant gases pass upwardly through the dense fluid phase of catalyst particles, and the effluent gasiform products of reaction emerge from the upper surface 12 into the catalyst disengaging space 18 of the reactor from which they pass through a filter 19, and pipe 20 to condenser 22 and decanter 24. It will be understood that filter 19 is merely exemplary of any other suitable means, such as cyclones, electrostatic precipitators and the like, for separating entrained solid particles from the gasiform stream. An oil product layer is withdrawn from separator or decanter 24 at 25, for further treatment or recovery. The water layer is removed at 26, and the residual overhead gases are drawn off through pipe 27. A portion of the overhead gases, if desired, is passed through recycle pipe 29 by compressor booster 28 to the inlet line 14 of the reaction zone.

Catalyst particles are continuously withdrawn downwardly from the bottom of the reaction zone through standpipe 30, by means of mechanical conveyor 32 which discharges into an elevator designated symbolically by the dotted line 33, supplying conveyor 34 at its upper extremity. As shown, conveyor 34, in turn, directs the stream of catalyst particles through pipe 35 into the reaction zone for reentry at about the pseudo-liquid level of the catalyst bed. As a result, the upper portion of the reaction zone is continuously supplied with a substantial quantity of highly active catalyst particles with the foregoing benefits and advantages.

As above intimated, it is preferred to provide for maintenance of uniform, predetermined operating temperature in the reaction zone by means of cooling surfaces indicated more or less symbolically by a tubular exchanger bundle 37 supplied with a coolant through inlet pipe 38 and having an upper outlet for coolant liquid or vapors as at 40. Advantageously, the cooling surfaces take the form of vertically extending tubes free from lateral projections and streamlined in the vicinity of the headers to assure uniformity of the fluid catalyst phase throughout the reaction zone. It may be desirable to extend the cooling tubes through the reaction zone with headers exteriorly thereof to increase the amount of heat transfer surface in contact with the fluid phase particles.

Supplemental temperature control may be provided by a cooling zone 42 interposed in the catalyst recycle or elevating system. It is to be specifically understood, however, that cooling in the exchanger 42 is necessarily effected either indirectly or in a substantially inert atmosphere such that the high activity of the circulating catalyst remains substantially unimpaired.

As a result, the highly active particles of catalyst discharged from conduit 35 promptly diffuse into the upper portion of the reaction zone and effect a surprising clean-up or consumption of the residual dilute reactants.

For example, in accordance with one illustrative method of operation, a vertical cylindrical reactor holding a fluidized catalyst mass about 10 ft. in height is continuously supplied at its lower end with an upflowing stream of synthesis gas comprising about 61% hydrogen and about 33% carbon monoxide. The reaction zone is at a pressure of about 400 p. s. i. g. and contains a mass of solid particle synthesis catalyst prepared by reducing magnetite to which has been added about 1% by weight $Al_2O_3$ and about 1.5% by weight $K_2O$ as promoters. The linear velocity of the gases flowing up through the catalyst mass is about 0.5 foot per second, sufficient to hold the mass in uniform dense fluid phase condition. A substantially uniform temperature of about 650° F. is maintained at all points in the fluidized mass by vertically extending cooling tubes distributed throughout the cross-section of the reactor and supplied with water under an elevated pressure to hold the desired operation temperature. Catalyst is continuously drawn off from the bottom of the reactor, elevated and reintroduced into the reaction zone at the pseudo-liquid level of the catalyst mass, thereby effecting the continual downward movement of catalyst in the reaction zone at a velocity of 3 feet per second. The reaction gases emerging from the fluidized catalyst mass are withdrawn from the reactor and treated to recover the reaction products, principally hydrocarbons with minor proportions of oxygenated hydrocarbons. The total recovery of $C_3+$ hydrocarbons including the minor proportions of oxygenated compounds amounts to 1.51 gallons per 1000 cubic feet of synthesis gas supplied to the reactor. When the same reaction system is operated without circulation of the catalyst and all other operating conditions remain substantially the same, the total recovery of $C_3+$ hydrocarbons including minor proportions of oxygenated compounds corresponds to only 1.32 gallons per 1000 cubic feet of charged synthesis gas.

As disclosed above, the invention has particular application to the use of iron synthesis catalysts, preferably those resulting from the reduction of an iron compound, such as one or more of the iron oxides, including mill-scale, roasted pyrites ore, magnetite, and synthetic ammonia-type iron catalysts. Reduction of the catalyst is usually followed by conditioning by synthesis gas under preferably mild conditions of temperature, for example, a temperature below 500° F. at which the catalyst possesses no substantial activity for the production of hydrocarbons. However, the invention in its broadest aspect, is applicable to other typical hydrocarbon synthesis catalysts, such as nickel, ruthenium and, particularly, cobalt catalysts. Additions to the catalyst of the usual modifying agents, activators and promoters are contemplated—such, for example, as the alkali and alkaline earth metal oxides, thoria, titania, alumina and many others.

The particle size of the catalyst may vary widely depending on the velocity of reaction gases and the density of the particles, the prime consideration being maintenance of a dense fluid phase of particles throughout the reaction zone. Usually the catalyst particles will vary from 60 to 400 mesh. Operating temperatures may vary in the range of about 500–750° F., preferably about 600–650° F. for iron catalysts, and the broad range extending to as low as about 350° F. where a cobalt or nickel catalyst is employed. Operating pressures preferably range from 200 to 500 p. s. i. g., but may be reduced to atmospheric or thereabouts in the broadest aspect of the invention. The reactant feed in general comprises synthesis gas, by which is meant a mixture of $H_2$ and CO in relative proportions suitable for substantial conversion into the desired products of reaction under the conditions of the reaction zone. In general, the reactant mixtures comprise $H_2$ and CO in the molar ratio of from about 1.5:1 to about 3.0:1.

Obviously many modifications and variations of the invention, as hereinbefore set forth, may be made without departing from the spirit and scope thereof and, therefore, only such limitations should be imposed as are indicated in the appended claims.

I claim:

1. In the production of hydrocarbons, oxygenated hydrocarbons and mixtures thereof by the passage of a synthesis gas comprising essentially hydrogen and carbon monoxide in contact with a fluidized mass of hydrocarbon synthesis catalyst particles in a vertically extending reaction zone at an elevated reaction temperature, wherein the synthesis gas is introduced into the bottom portion of the fluidized mass and passed upwardly therethrough, and wherein the gasiform stream emerging from said mass is treated for the recovery of desired products of reaction, the improvement which comprises continuously withdrawing highly active catalyst particles from the bottom portion of said fluidized mass, continuously reintroducing the withdrawn catalyst particles into the reaction zone in the vicinity of the upper surface of the mass where the reactants of said synthesis gas have been largely consumed, and effecting said catalyst withdrawal and elevation to the point of reintroduction under conditions such that the catalyst is substantially unaltered and at a rate such that the catalyst mass moves downwardly through the reaction zone with a linear velocity at least about twice that of the gases passing upwardly through the reaction zone.

2. The process according to claim 1, wherein the gases passing upwardly through the reaction zone have a linear velocity of about 0.3 to 1.5 feet per second.

3. The process according to claim 1, wherein the catalyst mass moves downwardly through the reaction zone with a linear velocity of about five times the linear velocity of the gases passing upwardly through the reaction zone.

4. The process according to claim 1, wherein the hydrocarbon synthesis catalyst comprises iron.

5. The process according to claim 1, wherein the catalyst mass moves downwardly through the reaction zone in contact with cooling surfaces disposed therein.

PAUL W. GARBO.

REFERENCES CITED

The following references are of record in the file of this patent:

UNITED STATES PATENTS

| Number | Name | Date |
|---|---|---|
| 2,447,505 | Johnson | Aug. 24, 1948 |
| 2,472,427 | Johnson | June 7, 1949 |